United States Patent
Lee et al.

(10) Patent No.: US 10,733,407 B2
(45) Date of Patent: Aug. 4, 2020

(54) APPARATUS AND METHOD FOR OBTAINING AN IMAGE FOR USER AUTHENTICATION USING PRESSURE SENSING

(71) Applicant: SUPREMA INC., Gyeonggi-do (KR)

(72) Inventors: Jong Man Lee, Gyeonggi-do (KR); Kideok Lee, Gyeonggi-do (KR); Hochul Shin, Gyeonggi-do (KR); Bong Seop Song, Gyeonggi-do (KR); Jae Won Lee, Gyeonggi-do (KR)

(73) Assignee: SUPREMA INC, Gyeonggi-Do (KR)

( * ) Notice: Subject to any disclaimer, the term of this patent is extended or adjusted under 35 U.S.C. 154(b) by 78 days.

(21) Appl. No.: 16/118,522

(22) Filed: Aug. 31, 2018

(65) Prior Publication Data
US 2019/0347463 A1  Nov. 14, 2019

(30) Foreign Application Priority Data
May 9, 2018 (KR) ..................... 10-2018-0053273

(51) Int. Cl.
*G06K 9/00* (2006.01)
*G06F 21/32* (2013.01)

(52) U.S. Cl.
CPC ......... *G06K 9/00013* (2013.01); *G06F 21/32* (2013.01); *G06K 9/00087* (2013.01)

(58) Field of Classification Search
CPC . G06K 9/00013; G06K 9/00087; G06F 21/32
See application file for complete search history.

(56) References Cited

U.S. PATENT DOCUMENTS

| | | | | |
|---|---|---|---|---|
| 8,683,582 B2* | 3/2014 | Rogers | ............... | H04W 12/06 726/21 |
| 2010/0066697 A1* | 3/2010 | Jacomet | ............... | G06F 21/32 345/173 |
| 2015/0067320 A1* | 3/2015 | Chatterton | ............ | G06F 21/316 713/100 |
| 2015/0363585 A1* | 12/2015 | Gooding | ............ | G06K 9/00382 726/19 |
| 2016/0371554 A1* | 12/2016 | Lee | ........................ | G06F 21/32 |
| 2017/0169278 A1* | 6/2017 | Setterberg | ............... | G06K 9/22 |
| 2018/0150679 A1* | 5/2018 | Kim | ................... | G06K 9/00013 |
| 2018/0224993 A1* | 8/2018 | Lee | ....................... | G06F 3/0414 |
| 2018/0329560 A1* | 11/2018 | Kim | ..................... | G06F 3/0414 |

FOREIGN PATENT DOCUMENTS

| | | | | |
|---|---|---|---|---|
| JP | 2015026228 A | * | 2/2015 | ............ A61B 5/489 |
| KR | 1020170122386 A | | 11/2017 | |

* cited by examiner

*Primary Examiner* — Khai M Nguyen
(74) *Attorney, Agent, or Firm* — Bacon & Thomas, PLLC

(57) ABSTRACT

There is provided a method for obtaining a user authentication image using pressure sensing. The method includes dividing a pressure sensing area corresponding to a fingerprint input window, with which a biometric feature of a user is brought into contact, into a plurality of partial areas, acquiring a plurality of image frames captured through the fingerprint input window and obtaining, for the partial areas, respective pressure sensing values synchronized with a capturing time of each of the image frames. The method further includes generating the user authentication image from the image frames based on comparison results between the pressure sensing values respectively obtained for the partial areas and one or more predetermined thresholds.

13 Claims, 6 Drawing Sheets

APPARATUS AND METHOD FOR OBTAINING AN IMAGE FOR USER AUTHENTICATION USING PRESSURE SENSING

CROSS-REFERENCE TO RELATED APPLICATIONS

This application claims priority to Korean Patent Application No. 10-2018-0053273 filed on May 9, 2018, the entire contents of which is incorporated herein by reference.

TECHNICAL FIELD

The present disclosure relates to an apparatus and method for obtaining an image for user authentication using pressure sensing.

BACKGROUND

User authentication has become very important along with the development of information and communication technology. In recent years, various user authentication methods have been developed in addition to the classic authentication method of using a code such as a password or the like.

In particular, user authentication methods using biometric information recognition are free from the risk of forgetting or losing the code such as the password or the like and are thus characterized by ease of use and reliable security. The user authentication methods using biometric information have been mainly used in embedded systems such as personal computers (PC) or automated teller machines (ATM). Recently, advancements in technology have expanded the use of the user authentication methods using biometric information to even mobile devices.

Among the various types of biometric information, fingerprints maintain the same pattern throughout the life term. Even if a fingerprint is damaged by external factors, it retains its original form through healing, and the probability of having an identical fingerprint with another is as low as one in one billion. Due to such advantages, the fingerprint is a common form of biometric information that is adopted as a means for authentication, and the field of fingerprint authentication is also very diverse.

In using fingerprint authentication, if the quality of the fingerprint image, which is acquired through a fingerprint input window that allows the user to input biometric information, is not guaranteed at a certain level or higher, an authentication failure may occur. In order to solve this problem, one of the user authentication methods for acquiring authentication images utilizes a background image acquired through the fingerprint input window. The background image is an image acquired through the fingerprint input window in a state where a biometric feature (e.g., the fingerprint of a user's finger) is not in contact with the fingerprint input window. By determining a difference between the fingerprint image and the background image, it is possible to reduce the adverse effect caused by residual fingerprints on the fingerprint input window.

However, in the case of an in-display fingerprint sensor, a large number of residual fingerprints remain on the fingerprint input window because users are frequently placing their fingerprint on the fingerprint input window during user authentication and touch input events. Therefore, it is difficult to obtain a high-quality image of the fingerprint due to the adverse effect caused by the residual fingerprints. This may result in a decrease in authentication performance.

Patent document 1: Korean Patent No. 10-1432011 (published on Aug. 13, 2014)

SUMMARY

In view of the above, embodiments of the present disclosure provide an apparatus and method capable of constantly acquiring a high-quality image for user authentication by using pressure sensing.

It is to be understood, however, that the object of the present disclosure is not limited to those mentioned above. Other objects not mentioned above will be clearly understood by those skilled in the art from the following description.

In accordance with an aspect of the present disclosure, there is provided a method for obtaining a user authentication image using pressure sensing, the method including: dividing a pressure sensing area corresponding to a fingerprint input window, with which a biometric feature of a user is brought into contact, into a plurality of partial areas; acquiring a plurality of-image frames captured through the fingerprint input window; obtaining, for the partial areas, respective pressure sensing values synchronized with a capturing time of each of the image frames; and generating the user authentication image from the image frames based on comparison results between the pressure sensing values respectively obtained for the partial areas and one or more predetermined thresholds.

In accordance with another aspect of the present disclosure, there is provided an apparatus for obtaining a user authentication image using pressure sensing, the apparatus including: an image acquisition unit configured to acquire a plurality of image frames captured through a fingerprint input window, with which a biometric feature of a user is brought into contact; a pressure measurement unit configured to measure a pressure applied to a pressure sensing area corresponding to the fingerprint input window; and an image processing unit configured to generate the user authentication image. Further, the image processing unit divides the pressure sensing area into a plurality of partial areas and obtains, for the partial areas, respective pressure sensing values synchronized with a capturing time of each of the image frames through the pressure measurement unit, and the image processing unit generates the user authentication image from the image frames based on comparison results between the pressure sensing values respectively obtained for the partial areas and one or more predetermined thresholds.

According to aspects of the present disclosure, fingerprint input data and background image data are obtained and updated in a manner that the pressure sensing area corresponding to the fingerprint input window, with which the biometric feature of the user is brought into contact, is divided into a plurality of partial areas; the partial areas the image frames captured through the fingerprint input window are classified into fingerprint input areas and fingerprint non-input areas based on the pressure sensing values thereof; and the fingerprint input data and the background image data are obtained and updated based on pixel values of pixels corresponding to the fingerprint input areas in each of the image frames and pixel values of pixels corresponding to the fingerprint non-input areas in each of the image frames. Therefore, it is possible to minimize the adverse effect caused by residual fingerprints or foreign substances on the fingerprint input window when obtaining a high-quality authentication image. In particular, it is possible to solve the problem of obtaining low quality authentication images due to the adverse effect of a large number of residual fingerprints, which may be attributable to the use of an in-display fingerprint sensor or the like. Accordingly, the probability of authentication failure for the user can be significantly reduced, and the reliability of an authentication system can ultimately be enhanced.

DETAILED DESCRIPTION

The advantages and features of the embodiments and the methods of accomplishing the embodiments will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

In describing the embodiments of the present disclosure, if it is determined that the detailed description of related known components or functions unnecessarily obscures the gist of the present disclosure, the detailed description thereof will be omitted. Further, the terminologies to be described below are defined in consideration of the functions of the embodiments of the present disclosure and may vary depending on a user's or an operator's intention or practice. Accordingly, the definition thereof may be made on a basis of the content throughout the specification.

Figure 1:
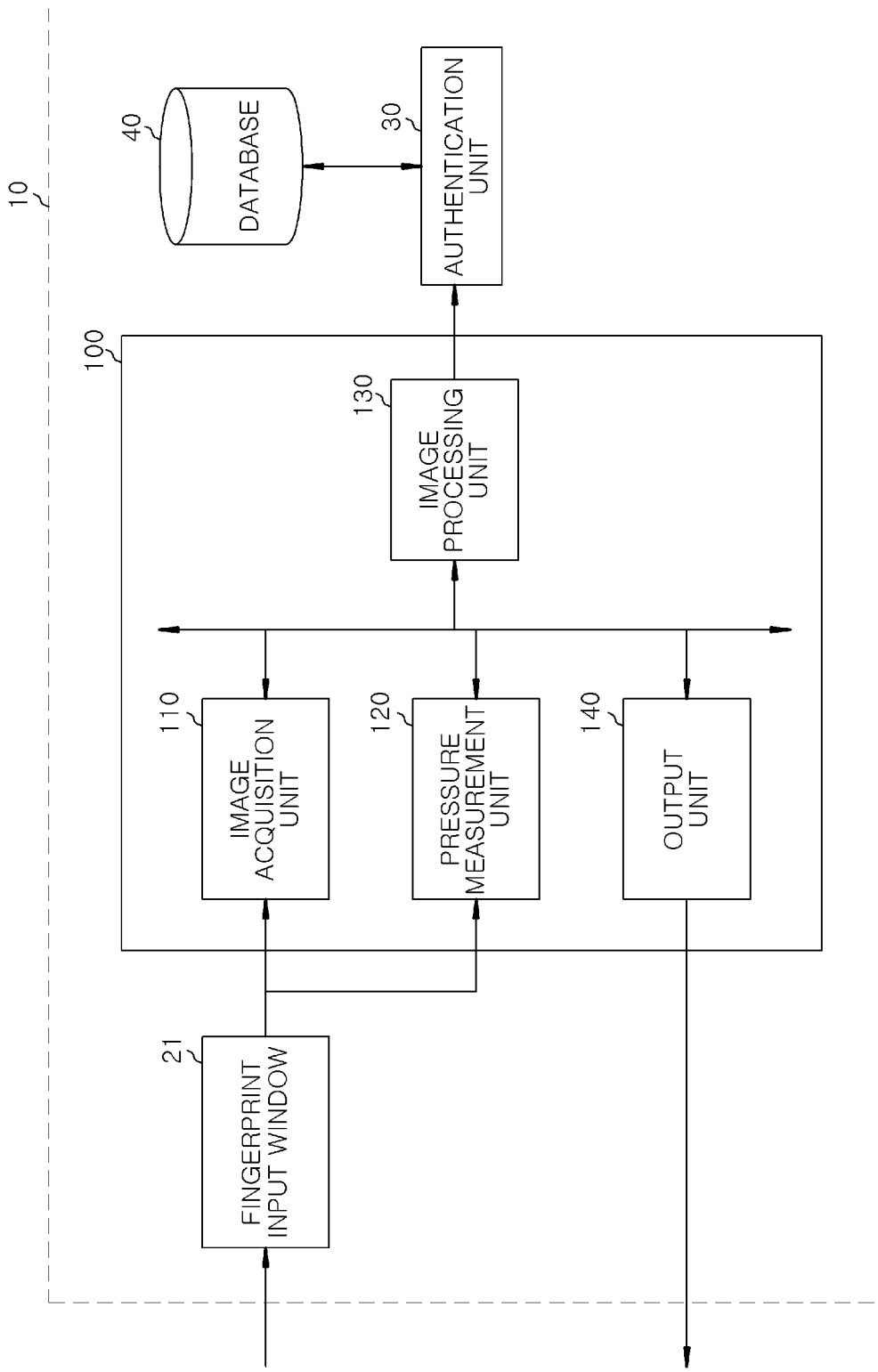
FIG. 1 shows a schematic configuration of a user-authentication-image acquisition apparatus using pressure sensing according to an embodiment of the present disclosure.

FIG. 1 shows a schematic configuration of a user-authentication-image acquisition apparatus according to an embodiment of the present disclosure. The user-authentication-image acquisition apparatus 100 shown in FIG. 1 is an apparatus for acquiring, from the finger of the user, a fingerprint image that is a user-authentication-image used for an authentication system 10 to authenticate a biometric feature of a user. Description will be made assuming that the authentication system 10 shown in FIG. 1 is a mobile device to which an in-display fingerprint detection method can be applied. However, the present disclosure is not limited thereto.

The user-authentication-image acquisition apparatus 100 may include an image acquisition unit 110, a pressure measurement unit 120, an image processing unit 130, and an output unit 140. However, since the user-authentication-image acquisition apparatus 100 shown in FIG. 1 is only an embodiment of the present disclosure, the technical idea of the present disclosure should not be narrowly construed to FIG. 1.

The image acquisition unit 110 is configured to acquire a plurality of image frames captured through a fingerprint input window 21 disposed in the authentication system 10. The image acquisition unit 110 may acquire the image frames by directly photographing the fingerprint input window 21 or may receive the image frames captured by a separately provided image capturing device. To this end, the image acquisition unit 110 may include an optical device for capturing an image. The fingerprint input window 21, with which a fingerprint is brought into contact by a user, is basically a separate element from the image acquisition unit 110. However, the fingerprint input window 21 may be integrated with the image acquisition unit 110.

Figure 2:
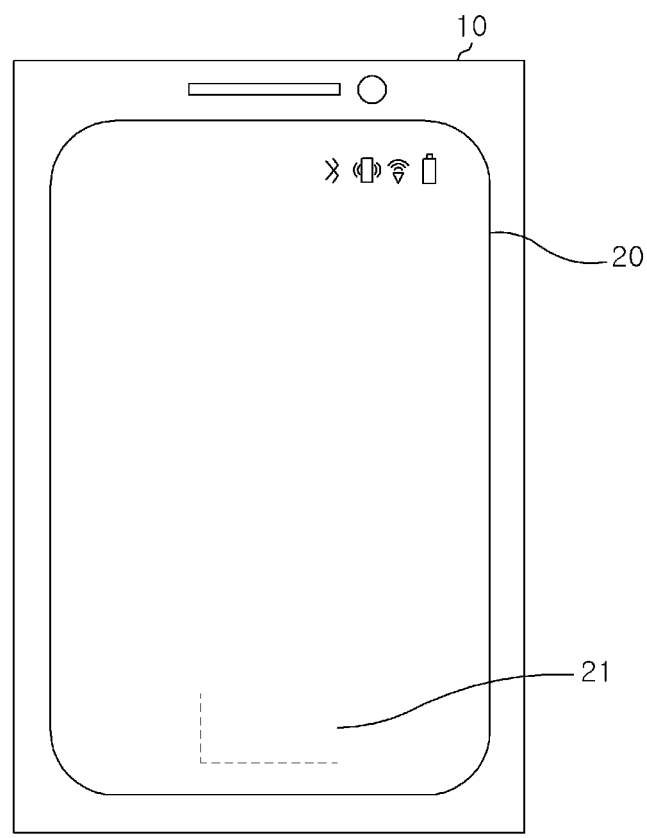
FIG. 2 shows a schematic configuration of a mobile device to which the user-authentication-image acquisition apparatus according to the embodiment of the present disclosure may be applied.

FIG. 2 shows a schematic configuration of a mobile device to which the user-authentication-image acquisition apparatus according to the embodiment of the present disclosure may be applied. In the example of FIG. 2, it is assumed that the authentication system 10 is a smartphone that can be used only by a user authenticated through a fingerprint. In the case where an in-display fingerprint detection system is employed in the authentication system 10, a partial region of a display 20 of the authentication system 10 may be used as the fingerprint input window 21.

Referring back to FIG. 1, the pressure measurement unit 120 is configured to measure the pressure applied to the fingerprint input window 21 when inputting the fingerprint with the user's finger, i.e., a pressure sensing value, which is the magnitude of the sensed pressure, for a pressure sensing area corresponding to the fingerprint input window 21. To this end, the pressure measurement unit 120 may include a pressure sensor. The pressure measurement unit 120 of the embodiment may be implemented through a so-called "force touch function" for measuring the strength of the touch of the user.

The image processing unit 130 is configured to divide the pressure sensing area corresponding to the fingerprint input window 21 into a plurality of partial areas and acquire, for each image frame, pressure sensing values for the respective partial areas through the pressure measurement unit 120, the pressure sensing values being synchronized with a capturing time of each of the image frames obtained by the image acquisition unit 110. The image processing unit 130 is further configured to generate a fingerprint image, which is an authentication image, from the image frames obtained by the image acquisition unit 110 based on the results of comparing the pressure sensing values obtained for the respective partial areas with a predetermined threshold. In the present embodiment, the image processing unit 130 may obtain fingerprint input data and background image data by using the pressure sensing values of the respective partial areas of the pressure sensing area to thereby generate the fingerprint image for authentication. Further, the image processing unit 130 may generate the fingerprint image for authentication by processing the plurality of image frames with a particular amount of pixel units corresponding to the partial areas of the pressure sensing area. The details of generating the fingerprint image, i.e., the authentication image in the image processing unit 130 will be described later. The image processing unit 130 and an authentication unit 30 to be described below may be implemented by including an arithmetic processing device such as a microprocessor or the like.

The authentication unit 30 is configured to determine whether to authenticate the user through a comparison between the authentication image received from the image processing unit 130 and a pre-stored fingerprint image stored in a database 40 of the authentication system 10. The authentication unit 30 and the database 40 may be provided in the authentication system 10 separately from the user-authentication-image acquisition apparatus 100, or may be included in the user-authentication-image acquisition apparatus 100. In this case, the user-authentication-image acquisition apparatus 100 may carry out not only the acquisition of the authentication image for the fingerprint but also the user authentication using the authentication image.

The database 40 may be specifically embodied as a computer readable storage medium. Examples of the computer readable storage medium may include magnetic media such as a hard disk, a floppy disk or a magnetic tape, optical media such as a CD-ROM or a DVD, a magneto-optical media such as a floptical disk or the like, and a hardware device such as flash memory or the like specifically configured to store and execute program instructions.

When the user needs to be informed of the occurrence of a specific event such as the completion of the acquisition of the authentication image or the like, the output unit 140 may output a predetermined notification that can be recognized by a user through at least one of the user's five senses. Such a notification may be implemented in various forms such as a visual notification, a tactile notification, an auditory notification and the like. Accordingly, the output unit 140 may include various well-known types of output devices. In some cases, the output unit 140 may be implemented using an output device already provided in the authentication system 10 (e.g., the display 20 shown in FIG. 2).

Figure 3:
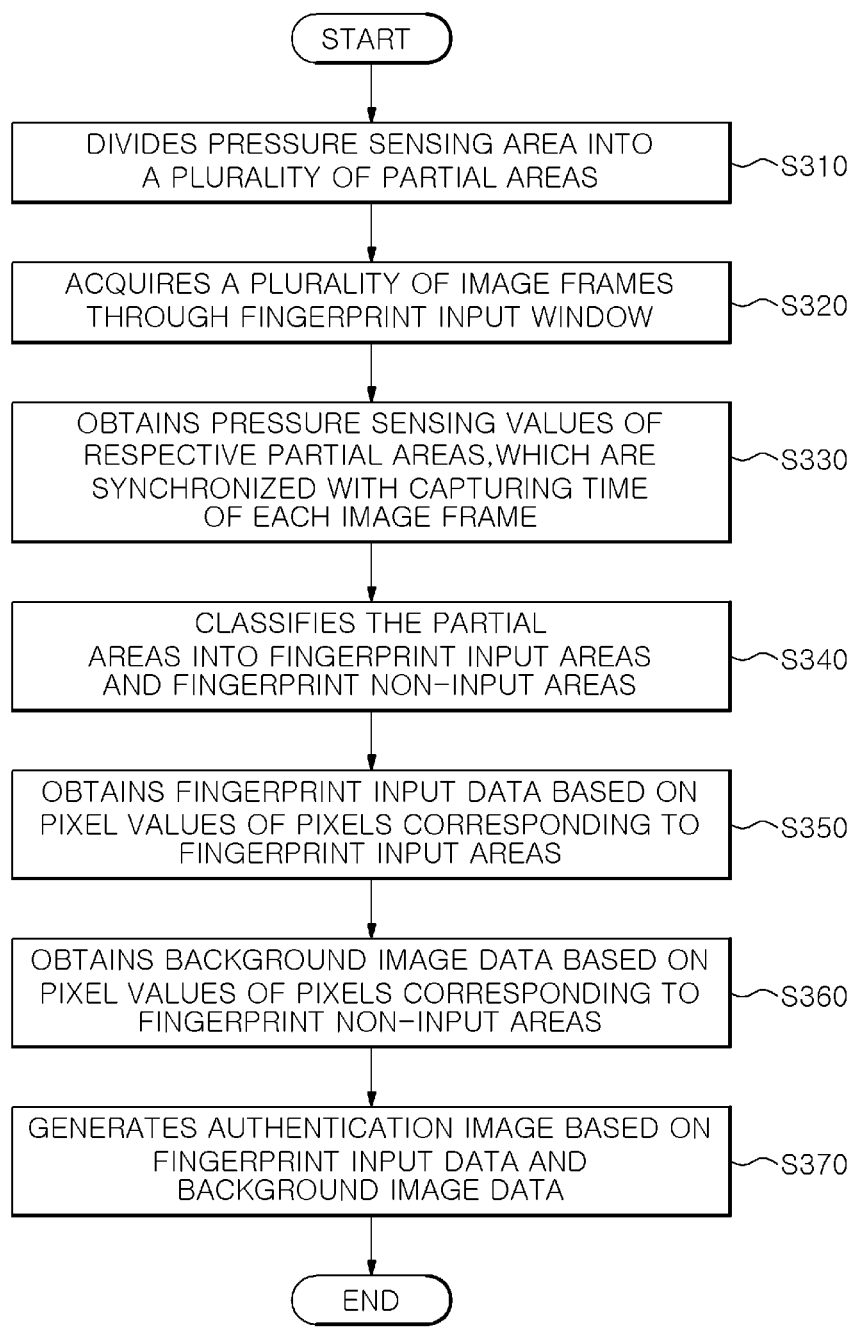
FIG. 3 is a flowchart illustrating the respective steps of a user-authentication-image acquisition method according to an embodiment of the present disclosure.

FIG. 3 is a flowchart illustrating the respective steps of a user-authentication-image acquisition method according to an embodiment of the present disclosure. The user-authentication-image acquisition method shown in FIG. 3 may be performed by the user-authentication-image acquisition apparatus 100 described with reference to FIG. 1. A repeated description similar to the description with reference to FIGS. 1 and 2 will be omitted. However, since the method shown in FIG. 3 is only an embodiment of the present disclosure, the concept of the present disclosure should not be narrowly construed to FIG. 3 and the respective steps of the method may be performed in an order different from that shown in FIG. 3.

First, in step S310, the image processing unit 130 of the user-authentication-image acquisition apparatus 100 divides the pressure sensing area of the pressure measurement unit 120 into a plurality of partial areas. Here, the pressure sensing area corresponds to the fingerprint input window 21 with which a biometric feature, e.g., the fingerprint, is brought into contact by the user. Then, area division information for the pressure sensing area is stored in an internal memory or the like. For example, the image processing unit 130 may divide the pressure sensing area corresponding to the fingerprint input window 21 into an n by m (n×m) number of partial areas where n and m are integer equal to or greater than 1.

Next, the pressure measurement unit 120 of the user-authentication-image acquisition apparatus 100 measures the pressure applied to the fingerprint input window 21 by the user's finger to obtain the pressure sensing values. Then, the obtained pressure sensing values are transmitted to the image processing unit 130. The pressure measurement unit 120 may continuously measure the pressure applied to the pressure sensing area corresponding to the fingerprint input window 21, and may repeatedly measure the pressure at a predetermined time interval.

In the circumstances mentioned above, the image acquisition unit 110 of the user-authentication-image acquisition apparatus 100 captures and acquires a plurality of image frames through the fingerprint input window 21 in step S320. Specifically, the image acquisition unit 110 acquires each of the image frames in such a way that the capturing time thereof is synchronized with the time when the pressure is measured in the pressure sensing area by the pressure measurement unit 120. Then, the acquired image frames are provided to the image processing unit 130.

In step S330, the image processing unit 130, while receiving the plurality of the image frames from the image acquisition unit 110, selects the pressure sensing values synchronized with the capturing time of each image frame among the pressure sensing values inputted from the pressure measurement unit 120. Then, the image processing unit 130 obtains the pressure sensing values of the respective partial areas based on the area division information for the pressure sensing area, which is stored in step S310.

Next, in step S340, the image processing unit 130 classifies the plurality of the partial areas into fingerprint input areas and fingerprint non-input areas based on the result of a comparison of the pressure sensing value obtained for each partial area with a predetermined threshold. For example, when a pressure sensing value of a specific partial area is equal to or greater than a predetermined threshold, this specific partial area is regarded as being pressed by the user's finger and the partial area can be classified as a fingerprint input area. On the other hand, when a pressure sensing value of a specific partial area is less than the predetermined threshold, this specific partial area is regarded as not being pressed by the user's finger and this partial area can be classified as a fingerprint non-input area.

Here, a single threshold value or a multiplicity of threshold values may be set to be used for distinguishing the fingerprint input area and the fingerprint non-input area. Different thresholds may be set depending on the capturing time of the image frame. For example, for the entire pressure sensing values synchronized with the capturing times of the respective image frames, a threshold used to compare with pressure sensing values of one image frame captured at a specific time to determine the fingerprint input area and the fingerprint non-input area may be different from threshold used to compare with pressure sensing values of another image frame captured at another specific time to determine the fingerprint input area and the fingerprint non-input area.

Figure 4:
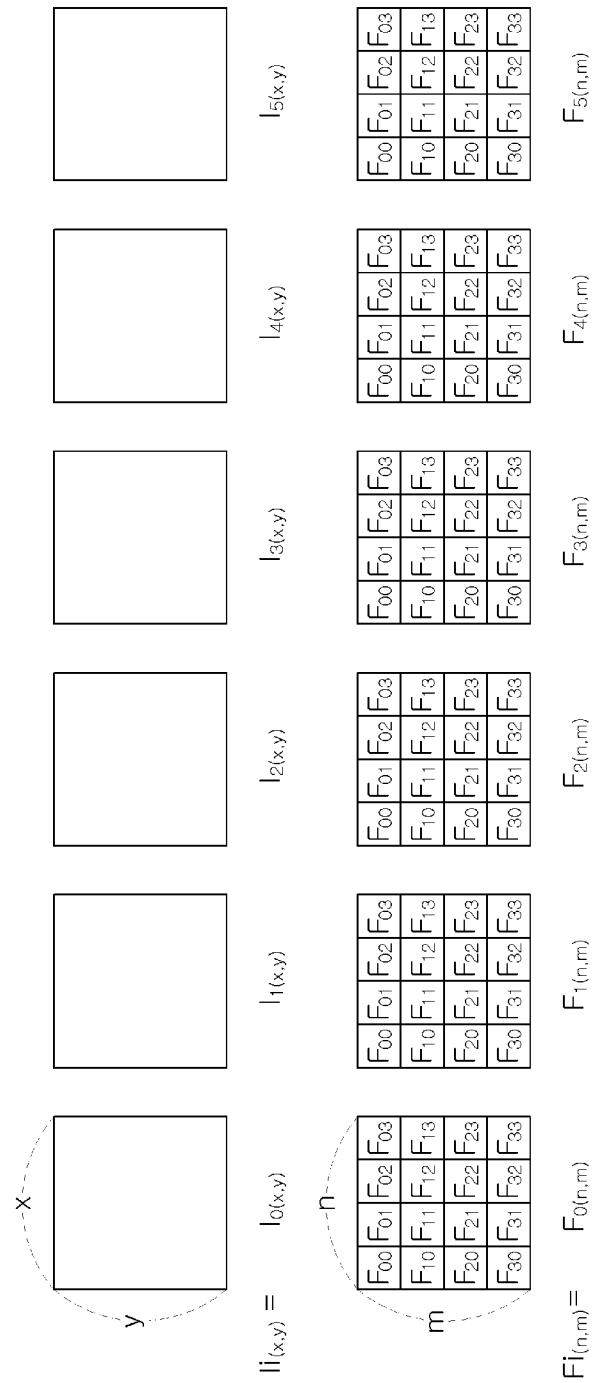
FIG. 4 is a view for explaining a plurality of image frames captured through a fingerprint input window and a pressure sensing area corresponding to each of the image frames in the user-authentication-image acquisition method according to the embodiment of the present disclosure.
Figure 5:
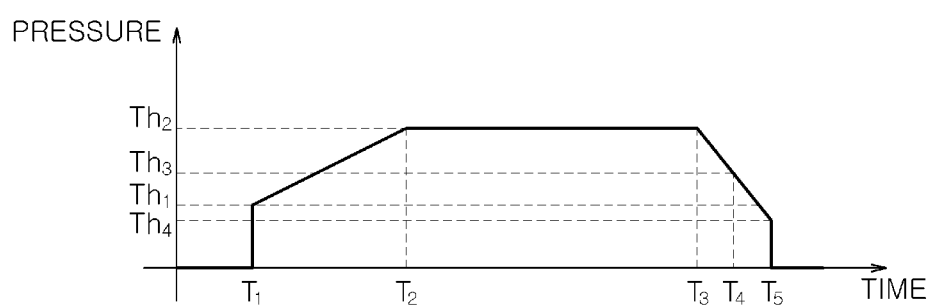
FIG. 5 is a graph explaining the relationship between time and pressure sensing value with a threshold in the user-authentication-image acquisition method according to the embodiment of the present disclosure.
Figure 6:
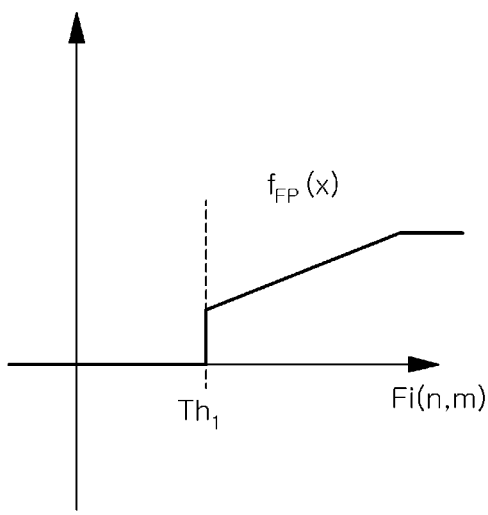
FIG. 6 is a graph showing the output of a fingerprint image function $f_{FP}(x)$ having, as an input thereof, a pressure sensing value synchronized with the capturing time of each image frame.
Figure 7:
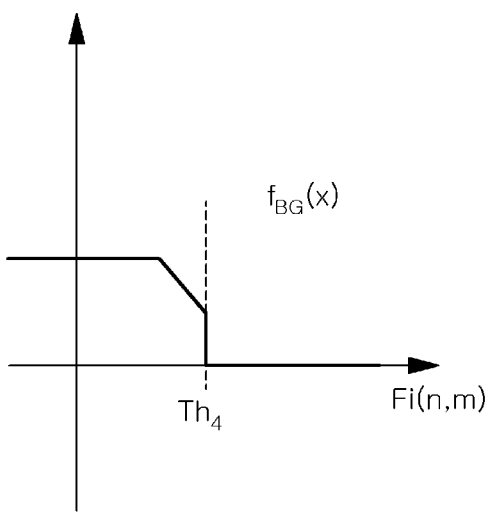
FIG. 7 is a graph showing the output of a background image function $f_{BG}(x)$ having, as an input thereof, a pressure sensing value synchronized with the capturing time of each image frame.

FIG. 4 is a view for explaining the plurality of image frames captured through the fingerprint input window and the pressure sensing area corresponding to each of the image frames in the user-authentication-image acquisition method according to an embodiment of the present disclosure. FIG. 5 is a graph explaining the relationship between time and pressure sensing value with a threshold in the user-authentication-image acquisition method according to the embodiment of the present disclosure. FIG. 6 is a graph showing an output of a fingerprint image function $f_{FP}(x)$ having, as an input thereof, a pressure sensing value synchronized with a capturing time of each image frame. FIG. 7 is a graph showing an output of a background image function $f_{BG}(x)$ having, as an input thereof, a pressure sensing value synchronized with a capturing time of each image frame.

Referring to FIGS. 4 to 7, description will be made of an embodiment in which a plurality of thresholds are set and used to distinguish the fingerprint input area and the fingerprint non-input area.

From the image acquisition unit 110, image frames $I_0$, $I_1$, $I_2$, $I_3$, $I_4$ and $I_5$ are inputted to the image processing unit 130. The image processing unit 130 acquires pressure sensing value sets $F_0$, $F_1$, $F_2$, $F_3$, $F_4$, and $F_5$, each of which includes pressure sensing values for the partial areas of each image frame of the pressure sensing area. Each of the pressure sensing value sets $F_0$, $F_1$, $F_2$, $F_3$, $F_4$, and $F_5$ is synchronized with the capturing time of the corresponding image frame.

Further, for each of the pressure sensing value sets $F_0$ or $F_1$, $F_2$, $F_3$, $F_4$, and $F_5$ acquired at predetermined time interval, the image processing unit 130 compares the pressure sensing values $F_{00}$, $F_{01}$, $F_{02}$, $F_{03}$, $F_{10}$, $F_{11}$, $F_{12}$, $F_{13}$, $F_{20}$, $F_{21}$, $F_{22}$, $F_{23}$, $F_{30}$, $F_{31}$, $F_{32}$ and $F_{33}$ of the respective partial areas with the predetermined thresholds to classify the partial areas into fingerprint input areas and fingerprint non-input areas based on the comparison results.

As shown in FIG. 5, a pressure sensing value of a specific partial area may vary when the user presses the fingerprint input window 21 using a finger to input a fingerprint and then releases the finger from the fingerprint input window 21. In FIG. 5, the time period before $T_1$ indicates the time period before the user touches the fingerprint input window 21 using a finger. The time period between $T_1$ and $T_5$ indicates the time period during which the user touches the fingerprint input window 21, and the time period after $T_5$ indicates the time period after the finger is released from the fingerprint input window 21. Further, the time period between $T_1$ and $T_2$ indicates the time period during which the pressing force applied to the fingerprint input window 21 is gradually increased after the user starts touching the fingerprint input window 21 using a finger, the time period between $T_3$ and $T_5$ indicates the time period during which the pressing force is gradually decreased after the user starts releasing a finger from the fingerprint input window 21, and the time period between $T_2$ and $T_3$ indicates the time period during which the pressure force is maintained. Hereinafter, without limiting the present disclosure thereto, for the sake of convenient explanation, the time period between $T_2$ and $T_3$ exemplifies the case where the pressure force is continuously maintained. For example, when the maximum pressure that may be measured by the pressure measurement unit 120 is set to a second threshold $Th_2$, the time period between $T_2$ and $T_3$ may be a time period during which the pressing force exceeds the maximum pressure.

The image processing unit 130 may determine the times $T_1$, $T_2$, $T_4$ and $T_5$ based on the comparison results between each of the first to fourth thresholds $Th_1$ to $Th_4$ and the pressure sensing values $F_{00}$, $F_{01}$, $F_{02}$, $F_{03}$, $F_{10}$, $F_{11}$, $F_{12}$, $F_{13}$, $F_{20}$, $F_{22}$, $F_{23}$, $F_{30}$, $F_{31}$, $F_{32}$ and $F_{33}$ of the respective partial areas. In the time period between $T_1$ and $T_4$, those of the pressure sensing values $F_{00}$, $F_{01}$, $F_{02}$, $F_{03}$, $F_{10}$, $F_{11}$, $F_{12}$, $F_{13}$, $F_{20}$, $F_{21}$, $F_{22}$, $F_{23}$, $F_{30}$, $F_{31}$, $F_{32}$ and $F_{33}$, which are equal to or greater than the first threshold $Th_1$, may be classified into the fingerprint input areas. On the other hand, those of the pressure sensing values $F_{00}$, those $F_{01}$, $F_{02}$, $F_{03}$, $F_{10}$, $F_{11}$, $F_{12}$, $F_{13}$, $F_{20}$, $F_{21}$, $F_{22}$, $F_{23}$, $F_{30}$, $F_{31}$, $F_{32}$ and $F_{33}$, which are less than the first threshold $Th_1$, may be classified into the fingerprint non-input areas. After time $T_4$, those of the pressure sensing values $F_{00}$, $F_{01}$, $F_{02}$, $F_{03}$, $F_{10}$, $F_{11}$, $F_{12}$, $F_{13}$, $F_{20}$, $F_{21}$, $F_{22}$, $F_{23}$, $F_{30}$, $F_{31}$, $F_{32}$ and $F_{33}$ chat are less than the third threshold $Th_3$ may be classified into the fingerprint non-input areas. Alternatively, after time $T_4$, the image processing unit 130 may use the fourth threshold $T_4$ to classify the fingerprint input areas and the fingerprint non-input areas. Here, when the image processing unit 130 classifies the fingerprint input areas and the fingerprint non-input areas by using the third threshold $Th_3$ instead of the fourth threshold $Th_4$ it is possible to prevent a fingerprint that is blurredly inputted during the time period between $T_4$ and $T_5$ due to the lower pressure of the user's finger applied to the fingerprint input window 21 from being reflected in the generation of the authentication image in step S370, which will be described later. Further, after time $T_4$, those of the pressure sensing values $F_{00}$, $F_{01}$, $F_{02}$, $F_{03}$, $F_{10}$, $F_{11}$, $F_{12}$, $F_{13}$, $F_{20}$, $F_{21}$, $F_{22}$, $F_{23}$, $F_{30}$, $F_{31}$, $F_{32}$ and $F_{33}$ that are less than the third threshold $Th_3$ and also are equal to or greater than the first threshold $Th_1$ may not be classified into either the fingerprint input areas or the fingerprint non-input areas so that, in the image frame, pixel values of pixels corresponding to the partial areas having such pressure sensing values can be discarded without being reflected in the authentication image.

Next, in step S350, the image processing unit 130 obtains fingerprint input data based on pixel values of pixels corresponding to the partial areas classified into the fingerprint input areas in step S340 in the image frames inputted from the image acquisition unit 110. For example, the image processing unit 130 obtains the fingerprint input data by giving a larger weight to the pressure sensing values of the fingerprint input areas that are equal to the second threshold $Th_2$ (the actual input pressure may be equal to or greater than the second threshold $Th_2$) compared to the pressure sensing values of the fingerprint input areas that are equal to or greater than the first threshold. $Th_1$ and less than the second threshold $Th_2$. This is because the fingerprint information obtained in the time period between $T_2$ and $T_3$ is more reliable than the fingerprint information obtained in the time period between $T_1$ and $T_2$.

Then, in step S360, the image processing unit 130 obtains background image data based on pixel values of pixels corresponding to the partial areas classified into the fingerprint non-input areas in step S340 in the image frames inputted from the image acquisition unit 110. For example, the image processing unit 130 obtains the background image data by giving a larger weight to the pressure sensing values of the fingerprint non-input areas that are equal to or less than the fourth threshold $Th_4$ compared to the pressure sensing values of the fingerprint non-input areas that are equal to or less than the third threshold $Th_3$ and greater than the fourth $Th_4$. This is because the background information obtained after time $T_5$ is relatively more reliable than the background information obtained in the time period between $T_4$ and $T_5$, since the fingerprint information is partially included in the time period between $T_4$ and $T_5$. Therefore, the background image data reflecting the latest states of the partial areas such as residual fingerprints or foreign substances on the fingerprint input window 21 is acquired by the image processing unit 130.

As described above, since each of the image frame data inputted at a predetermined time interval is classified into fingerprint input areas and fingerprint non-input areas in consideration of the pressure sensing values, each partial area can be a fingerprint input area or a fingerprint non-input area depending on the input time of the image frame data. Further, some partial areas may be identified as a fingerprint non-input area from the beginning to the end to contribute merely to the acquisition of the background image data.

With this configuration, the background image data is obtained before a finger of the user being authenticated is brought into contact with the partial areas of the fingerprint input window 21 of the display 20 (that is, when the pressure sensing values of the partial area are less than a predetermined threshold), and the fingerprint input data is obtained after the finger of the user being authenticated is in contact with the same partial areas (that is, when the pressure sensing values of the same partial areas is equal to or greater than a predetermined threshold). By obtaining the fingerprint image for the authentication based on the difference between the background image data and the fingerprint input data, the adverse effect caused by the residual image data is minimized and the fingerprint image of the user being authenticated can be obtained more accurately.

Next, in step S370, the image processing unit 130 generates the authentication image, i.e., the authentication fingerprint image for the authentication of the user based on the fingerprint input data obtained in step S350 and the background image data obtained in step S360. Then, the generated authentication image is transmitted to the authentication unit 30. For example, the fingerprint image for authentication may be generated by calculating a difference between the fingerprint input data and the background image data. The generation process of the authentication image by the image processing unit 130 may be repeated at a predetermined time interval or a preset frame interval (number of frames) to update the authentication image.

The above-described process generating the authentication fingerprint image from the plurality of image frames by the image processing unit 130 can be expressed by Equation (1) as follows:

$$I_{out} = \frac{\sum (f_{FP}(F_{i(n,m)}) \cdot I_{i(x,y)})}{\sum f_{FP}(F_{i(n,m)})} - \frac{\sum (f_{BG}(F_{i(n,m)}) \cdot I_{i(x,y)})}{\sum f_{BG}(F_{i(n,m)})} + \text{offset} \qquad \langle \text{Equation (1)} \rangle$$

where $F_i$ is the pressure sensing value synchronized with the capturing time of the ith image frame; $f_{FP}(x)$ and $f_{BG}(x)$ are functions of $F_i$; $I_i$ is the ith image frame; n and m are row and column values of the partial areas of the pressure sensing area; and x and y are the pixel coordinates of the image frame. Further, the maximum value of 'n' may be the same as the maximum value of 'x', and the maximum value of 'm' may be the same as the maximum value of 'y'.

As shown in Equation (1), the image processing unit 130 obtains the fingerprint input data based on the result of normalization after multiplying pixel values of pixels at coordinates corresponding to the fingerprint input areas in each of the image frames by the pressure sensing values of the fingerprint input areas, respectively. Further, the image processing unit 130 obtains the background image data based on the result of normalization after multiplying pixel values of pixels at coordinates corresponding to the fingerprint non-input areas in each of the image frames by the pressure sensing values of the fingerprint non-input areas, respectively. As a result, the image processing unit 130 generates the authentication fingerprint image $I_{out}$ by calculating the difference between the fingerprint input data and the background image data.

When the generation of the authentication image is completed through the image processing unit 130 as described above, the output unit 140 may output predetermined completion notification to inform the user that the acquisition of the authentication image has been completed. Such completion notification may be a vibration of the fingerprint input window 21, a visual change of the symbol being displayed on the fingerprint input window 21, or a combination of two or more types of completion notifications. Further, the authentication unit 30 may authenticate the user who inputs a finger through the fingerprint input window 21 by using the authentication image received from the image processing unit 130.

According to the embodiments of the present disclosure described so far, the fingerprint input data and the background image data are obtained and updated in a manner that the pressure sensing area corresponding to the fingerprint input window, with which the biometric feature of the user is brought into contact, is divided into the plurality of partial areas; the partial areas of the image frames captured through the fingerprint input window are classified into fingerprint input areas and fingerprint non-input areas based on the pressure sensing values thereof; and the fingerprint input data and the background image data are obtained and updated based on the pixel values of the pixels corresponding to the fingerprint input areas and the pixel values of the pixels corresponding to the fingerprint non-input areas in each of the image frames. Therefore, it is possible to minimize the adverse effect caused by the residual fingerprints or the foreign substances on the fingerprint input window in obtaining a high-quality authentication image. In particular, it is possible to solve the problem of obtaining a low quality authentication image due to the adverse effect of a large number of residual fingerprints, which may be attributable to the use of an in-display fingerprint sensor or the like. Accordingly, the probability of authentication failures for the user can be significantly reduced, and the reliability of an authentication system can ultimately be enhanced.

The combinations of the respective sequences of a flow diagram attached herein may be carried out by computer program instructions. Since the computer program instructions may be executed by the processor of a general purpose computer, a special purpose computer, or other programmable data processing apparatus, the instructions, executed by the processor of the computer or other programmable data processing apparatus, create means for performing functions described in the respective sequences of the sequence diagram. The computer program instructions, in order to implement functions in a specific manner, may be stored in a computer-readable storage medium or a computer-useable storage medium for other programmable data processing apparatus, and the instructions stored in the computer-readable storage medium or the computer-useable storage medium may produce manufacturing items that include means for instructions to perform the functions described in the respective sequences of the sequence diagram. The computer program instructions may be loaded in a computer or other programmable data processing apparatus, and therefore, the instructions, which are a series of sequences executed in a computer or other programmable data processing apparatus to create processes executed by a computer to operate a computer or other programmable data processing apparatus, may provide operations for executing functions described in the respective sequences of the flow diagram.

Moreover, the respective sequences may refer to two or more modules, segments, or codes including at least one executable instruction for executing a specific logic function (s). In some alternative embodiments, it is noted that the functions described in the sequences may be run out of order. For example, two consecutive sequences may be executed simultaneously or in reverse order according to the particular function.

The above description illustrates the technical idea of the present disclosure, and it will be understood by those skilled in the art to which this present disclosure belongs that various changes and modifications may be made without departing from the scope of the essential characteristics of the present disclosure. Therefore, the exemplary embodiments disclosed herein are not used to limit the technical idea of the present disclosure, but to explain the present disclosure, and the scope of the technical idea of the present disclosure is not limited by those embodiments. Therefore, the scope of protection of the present disclosure should be construed as defined in the following claims, and all technical ideas that fall within the technical idea of the present disclosure are intended to be embraced by the scope of the claims of the present disclosure.

What is claimed is:

1. A method for obtaining a user authentication image using pressure sensing, comprising:
    dividing a pressure sensing area corresponding to a fingerprint input window, with which a biometric feature of a user is brought into contact, into a plurality of partial areas;
    acquiring a plurality of image frames captured through the fingerprint input window;
    obtaining, for the partial areas, pressure sensing values of the respective partial areas synchronized with a capturing time of each of the image frames; and
    generating the user authentication image based on fingerprint input data and background image data which are obtained from the image frames based on comparison results between the pressure sensing values respectively obtained for the partial areas and one or more predetermined thresholds.

2. The method of claim 1, wherein said generating the user authentication image includes:
    classifying the partial areas into fingerprint input areas and fingerprint non-input areas based on the comparison results obtained at the capturing time of each of the image frames;
    obtaining the fingerprint input data based on pixel values of pixels corresponding to the fingerprint input areas in each of the image frames; and
    obtaining the background image data based on pixel values of pixels corresponding to the fingerprint non-input areas in each of the image frames.

3. The method of claim 2, wherein the one or more predetermined thresholds include a first threshold and a second threshold which is greater than the first threshold, and the fingerprint input data is obtained by giving a larger weight to the pressure sensing values of the fingerprint input areas that are equal to or greater than the second threshold compared to the pressure sensing values of the fingerprint input areas that are equal to or greater than the first threshold and less than the second threshold.

4. The method of claim 3, wherein the fingerprint input data is obtained based on a result of multiplying the pixel values of the pixels corresponding to the fingerprint input areas in each of the image frames by the pressure sensing values of the fingerprint input areas among the partial areas of the pressure sensing area, respectively.

5. The method of claim 3, wherein the one or more predetermined thresholds further include a third threshold which is greater than the first threshold and a fourth threshold which is less than the first threshold, and the background image data is obtained by giving a larger weight to the pressure sensing values of the fingerprint non-input areas that are equal to or less than the fourth threshold compared to the pressure sensing values of the fingerprint non-input areas that are equal to or less than the third threshold and greater than the fourth threshold.

6. The method of claim 5, wherein the background image data is obtained based on a result of multiplying the pixel values of the pixels corresponding to the fingerprint non-input areas in each of the image frames by the pressure sensing values of the fingerprint non-input areas among the partial areas of the pressure sensing area, respectively.

7. A non-transitory computer-readable storage medium including computer-executable instructions, wherein the instructions, when executed by a processor, cause the processor to perform a method for obtaining a user authentication image using pressure sensing, the method comprising:
    dividing a pressure sensing area corresponding to a fingerprint input window, with which a biometric feature of a user is brought into contact, into a plurality of partial areas;
    acquiring a plurality of image frames captured through the fingerprint input window;
    obtaining, for the partial areas, pressure sensing values of the respective partial areas synchronized with a capturing time of each of the image frames; and
    generating the user authentication image based on fingerprint input data and background image data which are obtained from the image frames based on comparison results between the pressure sensing values respectively obtained for the partial areas and one or more predetermined thresholds.

8. An apparatus for obtaining a user authentication image using pressure sensing, comprising:
    an image acquisition unit configured to acquire a plurality of image frames captured through a fingerprint input window, with which a biometric feature of a user is brought into contact;
    a pressure measurement unit configured to measure a pressure applied to a pressure sensing area corresponding to the fingerprint input window; and
    an image processing unit configured to generate the user authentication image,
    wherein the image processing unit divides the pressure sensing area into a plurality of partial areas and obtains, for the partial areas, pressure sensing values of the respective partial areas synchronized with a capturing time of each of the image frames through the pressure measurement unit, and
    the image processing unit generates the user authentication image based on fingerprint input data and background data which are obtained from the image frames based on comparison results between the pressure sensing values respectively obtained for the partial areas and one or more predetermined thresholds.

9. The apparatus of claim 8, wherein the image processing unit performs the generation of the user authentication image by classifying the partial areas into fingerprint input areas and fingerprint non- input areas based on the comparison results obtained at the capturing time of each of the image frames;

obtaining the fingerprint input data based on pixel values of pixels corresponding to the fingerprint input areas in each of the image frames; and obtaining the background image data based on pixel values of pixels corresponding to the fingerprint non-input areas in each of the image frames.

10. The apparatus of claim 9, wherein the one or more predetermined thresholds include a first threshold and a second threshold which is greater than the first threshold, and the image processing unit obtains the fingerprint input data by giving a larger weight to the pressure sensing values of the fingerprint input areas that are equal to or greater than the second threshold compared to the pressure sensing values of the fingerprint input areas that are equal to or greater than the first threshold and less than the second threshold.

11. The apparatus of claim 10, wherein the image processing unit obtains the fingerprint input data based on a result of multiplying the pixel values of the pixels corresponding to the fingerprint input areas in each of the image frames by the pressure sensing values of the fingerprint input areas among the partial areas of the pressure sensing area, respectively.

12. The apparatus of claim 10, wherein the one or more predetermined thresholds further include a third threshold which is greater than the first threshold and a fourth threshold which is less than the first threshold, and the image processing unit obtains the background image data by giving a larger weight to the pressure sensing values of the fingerprint non-input areas that are equal to or less than the fourth threshold compared to the pressure sensing values of the fingerprint non-input areas that are equal to or less than the third threshold and greater than the fourth threshold.

13. The apparatus of claim 12, wherein the image processing unit obtains the background image data based on a result of multiplying the pixel values of the pixels corresponding to the fingerprint non-input areas in each of the image frames by the pressure sensing values of the fingerprint non-input areas among the partial areas of the pressure sensing area, respectively.

* * * * *